A. KENNEDY & J. H. BERKSHIRE,

Assignors of one-third to C. PAGE.

FEED WATER HEATER.

No. 10,138. Reissued June 13, 1882.

Witnesses:

Henry Orth

Wm. A. McAtee.

Inventors:

Archibald Kennedy

John H. Berkshire

By W. Burris

Attorney

UNITED STATES PATENT OFFICE.

ARCHIBALD KENNEDY AND JOHN H. BERKSHIRE, OF MUSCATINE, IOWA, ASSIGNORS OF ONE-THIRD TO CHARLES PAGE, OF SAME PLACE.

FEED-WATER HEATER.

SPECIFICATION forming part of Reissued Letters Patent No. 10,138, dated June 13, 1882.

Original No. 124,065, dated February 27, 1872. Application for reissue filed April 15, 1882.

*To all whom it may concern:*

Be it known that we, ARCHIBALD KENNEDY and JOHN H. BERKSHIRE, citizens of the United States, residing at Muscatine, in the county of Muscatine and State of Iowa, have invented certain new and useful Improvements in Feed-Water Heaters and Purifiers, of which the following is a specification, reference being had therein to the accompanying drawings.

Our invention relates to improvements in the means and methods of condensing exhaust-steam and heating and purifying water for feeding boilers of steam-engines. The improved means we employ for these purposes consist of a steam receiver and distributer adjusted under a cold-water-supply pipe in the upper part of an elongated vertical tank, of suitable dimensions for facilitating the condensation of the steam and the heating of the water; of a diaphragm and conducting-pipe below the condenser and distributer for conducting the water to the lower part of the tank; of a vessel located below filter-chambers and above a mud-well, which vessel is adjusted to receive the descending water, and from which the water rises without coming in contact with the sediment in the well, and is filtered as it ascends through the filters into a clear-water chamber, whence it is conveyed to the feed-pump. The sediment too heavy to rise descends into the well below, as hereinafter more fully described.

Figure 1:
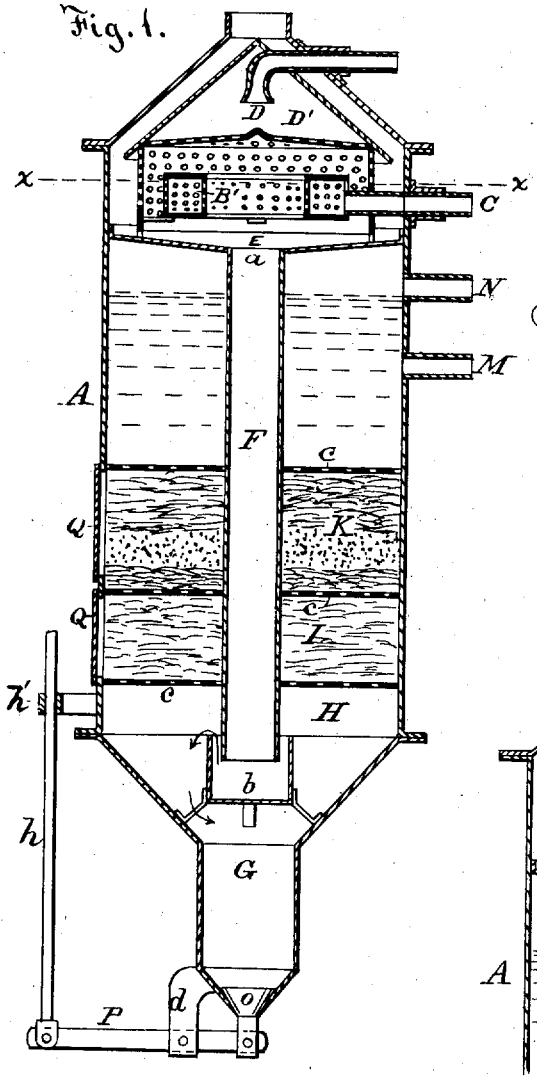
Figure 2:
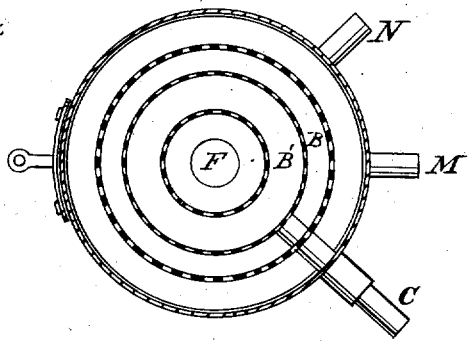
Figure 3:
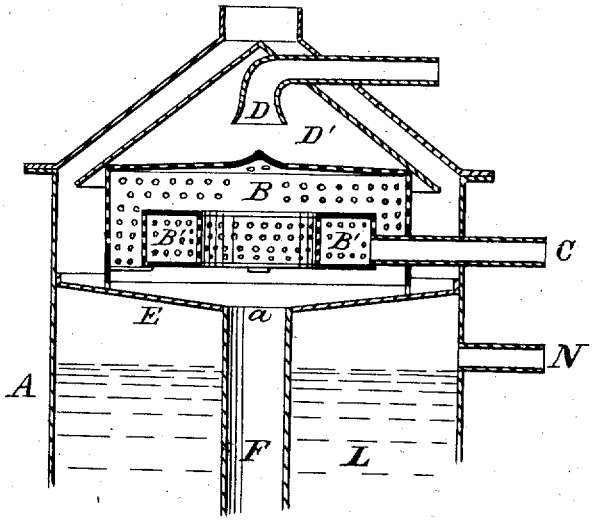

In the drawings, Figure 1 is a vertical sectional view of the apparatus for condensing steam and purifying water. Fig. 2 is a transverse section on line *x x* of Fig. 1. Fig. 3 is a vertical section of the upper portion of the tank, showing an enlarged view of the steam receiver and distributer and other connecting parts.

A is the case of an elongated vertical tank, of sheet metal or other suitable material, constructed preferably with conical ends. The upper part of the tank is provided with a steam receiver and distributer, consisting of a chamber, B, formed by perforated walls and cover, and having an inner chamber, B′, formed by perforated side walls and unperforated bottom and cover. The edges of the side walls of chamber B, or feet attached thereto, rest on the diaphragm E, hereinafter described.

C is the steam-escape pipe extended through the walls of the tank and chambers into the inner chamber, B′, as shown in the drawings.

D represents the mouth of a cold-water-supply pipe extended through the tank-wall into chamber D′, immediately above the distributer.

The diaphragm E, located immediately below the receiver and distributer, extends entirely across the tank, and is fastened to its walls, and is downwardly inclined to the central opening, *a*, forming the mouth of the pipe F, which extends from the diaphragm downward through the water-chambers and filter-chambers H I K L, and terminating in the upper part of an open-top vessel, *b*, larger in diameter than the pipe, which vessel is located and suitably supported in the water-chamber H above the mud-well G. The filter-chambers I K are separated from each other and from the water-chambers H L by the perforated partitions *c*.

M is a pipe for conveying the filtered water from the chamber L to the feed-pump. (Not shown.)

N is a pipe, located in the upper part of the clear-water chamber L, for carrying off the surplus water.

O is a valve in the lower end of the mud-well, and is operated by means of a lever, P, pivoted to a fulcrum-arm, *d*, and connected at one end to the stem of the valve, and provided at the other end with an upright handle, *h*, extended through a guide, *h′*, attached to the tank.

Q represents covers over man-holes through the wall of the tank into the filter-chambers, for packing them.

In operation the exhaust-steam is discharged from the cylinder (not shown) through the pipe C into the receiving-chamber B′, and is sprayed through the perforated sides of this chamber into the chamber B, where it meets the cold water showered from the pipe D through the perforated top of chamber B, and is condensed and sprayed through the perforated sides of this chamber, and with the water from supply-pipe D, heated by the steam, descends upon the diaphragm E, and by it is conducted to the pipe F, which conducts it into the receiving-vessel *b* above the well, whence it rises, without mingling with the sediment in the well below, through chamber H and filtering-chambers I K into the clear-water chamber L, whence it is conveyed through pipe M to the feed-pump. The sediment too heavy to rise with the water through chamber H descends into the mud-well, as indicated by the arrows in Fig. 1 of the drawings. Downward pressure upon the handle *h* lifts the valve O, allowing the sediment in the well G to escape, and also allowing the clear water in chamber L to flow downward through the filter-chambers, thoroughly cleansing them and removing from the sides of the water-chambers all accumulated sediment.

This apparatus is very efficient in condensing the exhaust-steam and in heating and purifying the water for the feed-pump. It is also useful as a filter alone for purifying water for any use, especially for the supply of railroad-tanks for filling locomotive-tenders.

By means of the steam receiver and distributer having perforated walls and located under the supply-pipe, as described and shown, the steam is thoroughly distributed and brought in contact with the falling water without sudden puffs at the commencement of the exhaust, thus facilitating the condensation of the steam and the heating of the water, and easing the first injection of the exhaust from the cylinder and ameliorating the exhaust, while at the same time the receiver and distributer prevents the water from being forced into the escape-pipe, allowing an easy and even escapement of the steam.

What we claim as new, and desire to secure by Letters Patent, is—

1. In an apparatus for condensing steam and heating and purifying feed-water, the steam receiver and distributer B B′, arranged in a tank under the cold-water-supply pipe, substantially as and for the purposes described.

2. The combination, in the tank A, with the receiver and distributer B B′, of the diaphragm E and conducting-pipe F, constructed and arranged to conduct the heated water and condensed steam to the lower part of the tank for upward filtration, substantially as and for the purposes described.

3. The combination, with the pipe F, arranged below the diaphragm E, to conduct the water to the lower part of the tank A, of the vessel *b*, arranged below the filter-chambers K L and immediately above the mud-well G, to receive the descending water and allow it to ascend for filtration without coming in contact with the sediment below, substantially as described.

4. The combination, in the tank A, provided with the water-chambers and filter-chambers H I K L, located as set forth, of the receiver and distributer B B′, the diaphragm E, the pipe F, the vessel *b*, and the mud-well G, substantially as and for the purposes described.

In testimony whereof we affix our signatures in presence of two witnesses.

ARCHIBALD KENNEDY.
JOHN H. BERKSHIRE.

Witnesses:
S. M. HUGHES,
T. R. FITZGERALD.